(12) United States Patent
Steiner et al.

(10) Patent No.: US 6,791,902 B1
(45) Date of Patent: Sep. 14, 2004

(54) PORTABLE FISH FINDER

(75) Inventors: Mark Steiner, Alpharetta, GA (US); Wendell Wilson, Marietta, GA (US); Patrick Spivey, Atlanta, GA (US); Jared Rudd, Buford, GA (US); Darrell Watt, Marietta, GA (US); Marti Elnicki, NE Atlanta, GA (US)

(73) Assignee: Techsonic Industries, Inc., Eufaula, AL (US)

( * ) Notice: Subject to any disclaimer, the term of this patent is extended or adjusted under 35 U.S.C. 154(b) by 33 days.

(21) Appl. No.: 10/160,282

(22) Filed: May 30, 2002

(51) Int. Cl.[7] ............................................. G01S 15/96
(52) U.S. Cl. ......................... 367/99; 367/111; 367/910
(58) Field of Search ........................... 367/99, 111, 910; D10/65

(56) References Cited

U.S. PATENT DOCUMENTS

| | | | |
|---|---|---|---|
| D289,265 S | 4/1987 | Wood et al. | D10/46 |
| D296,767 S | 7/1988 | Wood et al. | D10/46 |
| 4,829,493 A | 5/1989 | Bailey | 367/111 |
| D389,757 S | 1/1998 | Nishimura et al. | D10/65 |
| 6,019,325 A | 2/2000 | Dotson et al. | 248/121 |
| D422,924 S | 4/2000 | Bendinelli | D10/65 |
| 6,222,449 B1 | 4/2001 | Twining | 340/539 |
| D441,670 S | 5/2001 | Jackson et al. | D10/65 |
| D453,300 S | 2/2002 | Schoenfish et al. | D10/65 |
| D453,477 S | 2/2002 | Schoenfish et al. | D10/65 |
| D459,250 S * | 6/2002 | Kitamura | D10/65 |
| D468,652 S * | 1/2003 | Steiner et al. | D10/65 |
| D474,701 S * | 5/2003 | Steiner et al. | D10/65 |

OTHER PUBLICATIONS

Piranha 4 Portable Fishfinder, Humminbird.com, 2003, 2 Pages.*
Outer Banks Outfitters Boater' World Marine Centers (1999 Master Gear Catalog), Atlantic Station, P.O. Box 3330, Atlantic Beach, NC 28512, cover, pp. 4, 5,11–15, 17, 18, 20, 21, 23, 30–34, back cover.
Bass Pro Shops 2000 Master Catalog, Springfield, MO.
Brochure, Zercom Marine, 1999, Techsonic Industries, a Division of Teleflex Inc.

* cited by examiner

*Primary Examiner*—Daniel T. Pihulic
(74) *Attorney, Agent, or Firm*—Baker, Donelson, Bearman, Caldwell & Berkowitz

(57) ABSTRACT

A portable fish finder device with a housing that defines a wrap cavity for receiving a signal cable that communicates between a depth finder device and a transducer attached to the water craft. A skirt connected to the housing moves between a first position covering the wrap cavity and a second position uncovering the cavity for winding or unwinding the signal cable. The depth finder device pivotally mounts to the housing to move between a storage position with a display screen received in a recess of the housing and an extended position for viewing the display. The cable winds into the wrap cavity for storage and unwinds when the housing is disposed on a portion of a water craft for use of the depth finder with the transducer communicating signals in a body of water for detecting underwater articles.

26 Claims, 5 Drawing Sheets

PORTABLE FISH FINDER

TECHNICAL FIELD

The present invention relates to depth finder or fish finder devices. More particularly, the present invention relates to portable depth or fish finder devices that enclose power and signal cables, transducer, and graphic display in a convenient package for non-permanent installation and use on water craft.

BACKGROUND OF THE PRESENT INVENTION

Water craft and water-related sports activities are becoming increasingly popular recreational activities. Water-related boating activities include sailing, fishing, deep sea fishing, power boat sports such as water skiing and the like, kayaking, canoeing, and other sports activities on rivers, lakes and ocean. These recreational activities occur on waters of varying depths, bottom conditions, and obstructions and debris submerged and generally not visible from the surface.

The capability to detect sub-surface conditions and articles, such as bottom surface conditions and depths, underwater obstructions and debris, and fish at varying depths, has become increasingly important. Operators of water craft frequently use marine electronic equipment known as depth detectors or fish finder devices for locating underwater articles. Fish finder devices use sonar technology that emits acoustic waves or beams from a transducer in the water. The acoustic beams reflect from the underwater articles, and return to the transducer as "echoes". The return echoes are analyzed, and an image is presented on a display representative of the underwater articles from which the return echoes reflect.

Generally, fish finder devices are permanently mounted to the water craft. The analyzer and display contained within a housing that mounts with brackets to a dashboard or cockpit of the water craft. Power and signal cabling connects the fish finder device to a transducer that emits the acoustic beams into the water and receives the return echos.

Some fish finder devices however also provide quick disconnect mounts so that the fish finder device can be readily removed from the permanently installed mounting bracket. Readily detachable fish finder devices are particularly useful in water craft lacking satisfactory security for the cockpit area. With the cabling and transducer permanently mounted, the operator of the water craft carries the fish finder device to and from the water craft for use.

For smaller water craft such as kayaks and canoes, and other power boat and water craft as well, the fish finder device and transducer is not permanently mounted. Rather, transportable housings enclose the fish finder device and in some types includes compartments for storing the cable and the transducer assembly. A transducer assembly typically includes a bracket, a flexible suction cup connected to the bracket, and a transducer mounted to one end of the bracket. The bracket attaches to the transom of the water craft with the suction cup and connects with the cable to the fish finder device having a display screen. Typically, the fish finder device sits on a forward portion of the water craft for ready viewing of the display screen by the boater.

While such portable devices have provided water craft owners a non-permanent fish finder device, there are drawbacks to their use. In particular, the display and analyzer fish finder device, with its cable and transducer assembly is awkward and cumbersome for storage and handling of the portable fish finder. Further, the display and analyzer fish finder device, being freely seated on a portion of the watercraft, risks moving and falling while the watercraft is underway or experiencing heavy chop or rough waves. Further, the cabling is inconveniently held within a separate compartment of the housing. This leads to possible tangling and difficulty in retrieving and storing the cabling.

Accordingly, there is a need in the art for an improved portable fish finder device that conveniently encloses the power and signal cable, the display screen and analyzer housing, and the transducer assembly for handling and storage while readily accessible for use. It is to such that the present invention is directed.

SUMMARY OF THE PRESENT INVENTION

The present invention meets the need in the art by providing a portable depth finder device that conveniently encloses a signal cable, a depth finder device including a display, and a transducer assembly for handling and storage while readily accessible for use, comprising a housing defining a wrap cavity in at least a portion of the housing for receiving a signal cable, a skirt connected to the housing and movable between a first position covering the wrap cavity and a second position uncovering the wrap cavity, and a depth finder device mounted to the housing for communicating through the signal cable with the transducer assembly, the signal cable being wrapped in the wrap cavity for storage and unwrapped therefrom when the housing is disposed on a portion of a water craft with a transducer in a body of water for determining depths.

Objects, advantages and features of the present invention will become apparent from a reading of the following detailed description of the invention and claims in view of the appended drawings.

DETAILED DESCRIPTION

Figure 1:
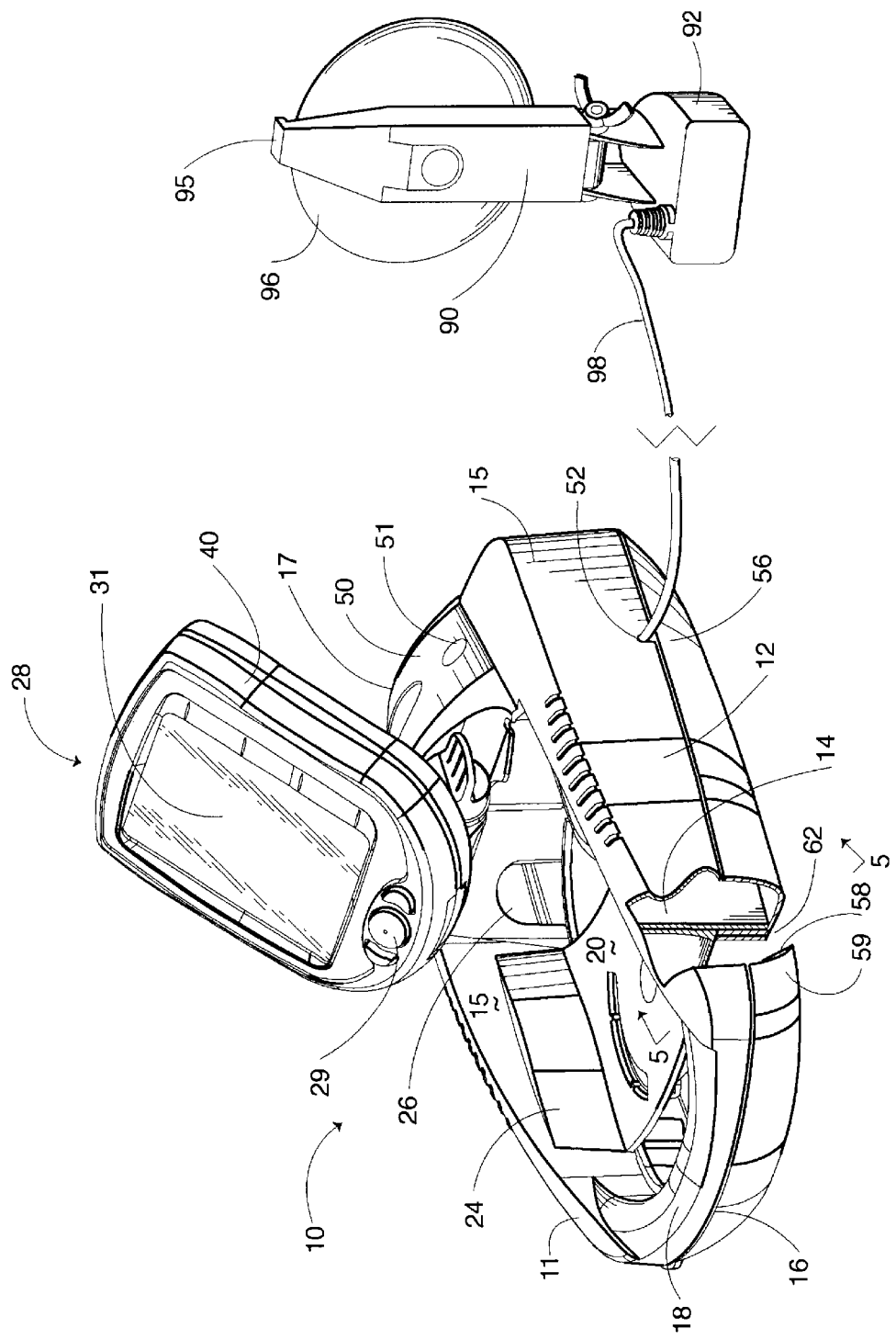
FIG. 1 illustrates a partially cut-away perspective view of the portable fish finder apparatus of the present invention, in an operating position.

With reference to the drawings, in which like parts have like reference numerals, FIG. 1 illustrates in partially cut-away perspective view a portable fish finder 10 according to the present invention. The fish finder 10 comprises a shell 11 having an outside wall 12 and an inner wall 14 as shown in partial cut-away view. The inner wall 14 defines opposing sides 15. A first end 16 of the shell 11 defines a narrowed portion for a handle 18 in a top carrying portion of the shell 11 opposing a second or bottom end 17. A back wall 19 interior of the shell 11 opposes the handle 18. A plate 20 extends between the opposing sides 15 of the inner wall 14.

The plate 20 in cooperation with the inner wall 14 and the back wall 19 define a first recess 24. The back wall 19 defines an opening 26 through which cables (not illustrated) pass for connecting a housing for a depth or fish finder device generally 28 to a transducer, as discussed below. The fish finder device 28 conventionally includes an analyzer that analyzes the return signals from the transducer 92 (discussed below), control buttons 29 to operate the fish finder device 28, and a display screen 31 to present images representative of detected underwater articles.

A pair of flanges 30 (best illustrated in FIG. 2) extend from the back wall 20. A post 38 extends from a back of a housing 40 for the fish finder device 28. The post 38 and the flanges 30 define coaxial passageways for receiving a threaded fastener 44 that engages a cap 46 to secure the housing 40 in a selected position relative to the flanges 30. A back portion of the shell 11 defines a battery compartment 48 (see FIG. 3) closed by a battery door 50. The door 50 defines openings 51 for receiving fasteners for securing the compartment 48.

A portion of the outside wall 12 defines a slot 52 for passage of the cable 98 connecting the fish finder device 28 to the transducer, as discussed below.

A plurality of ribs 54 disposed in spaced-apart relation project outwardly from outside edges of the shell 11 intermediate the first end 16 and the opposing distal end 17. The projecting ribs 54 facilitate using a webbed band to secure the portable fish finder 10 to a portion of a water craft, as discussed below.

A flexible skirt 56 has a first portion 58 that conformingly contacts a portion of the inner wall 14 on the sides, the handle 18, and the back wall 20. A second portion 59 arcuately extends towards the distal edges of the outside wall 12 on the sides, the handle 18, and the opposing end 17 of the shell 11. The sides 15 of the inner wall 14, the inner surface of the handle 18, and the back wall 19 define a cavity 62 shown in cut-away view about the perimeter of the fish finder 10. As discussed below, the signal cable 98 wraps or winds in the cavity 62 about a perimeter of the portable fish finder 10 (or a portion thereof).

Figure 2:
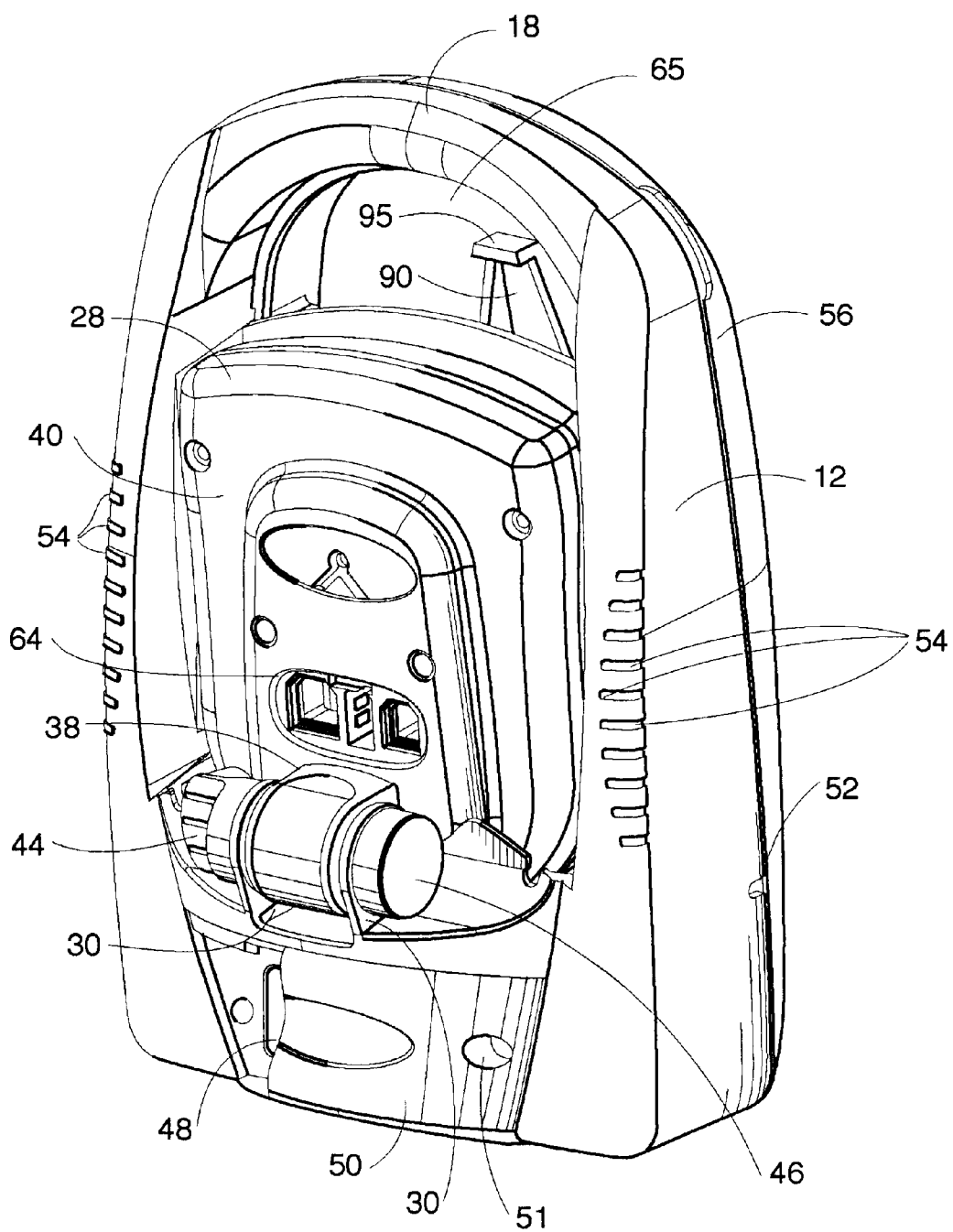
FIG. 2 is a front perspective view of the fish finder device illustrated in FIG. 1 in a storage position.

FIG. 2 is a front view of the fish finder 10 illustrated in FIG. 1 in a storage position. The fish finder device 28 is illustrated pivoted about the flanges 30 into the recess 24. The display screen 31 for the fish finder device 28 is thereby received within the recess 24 against the plate 20. This provides protection from incidental contact against the display screen 31 during storage, carrying and handling of the portable fish finder 10. The back of the fish finder device 28 is illustrated with ports generally 64 for receiving power and transducer signal cables. These cables extend through the opening 26 (see FIG. 1) between the fish finder device 28 and the cavity 62. The power supply cable connects with electrical contacts within the battery compartment 48 (shown in partial cut-away view). The opposing walls 12, 14, an edge of the plate 20 and the handle 18 define an opening generally 64. The handle 18 is readily gripped for carrying the portable fish finder 10.

Figure 3:
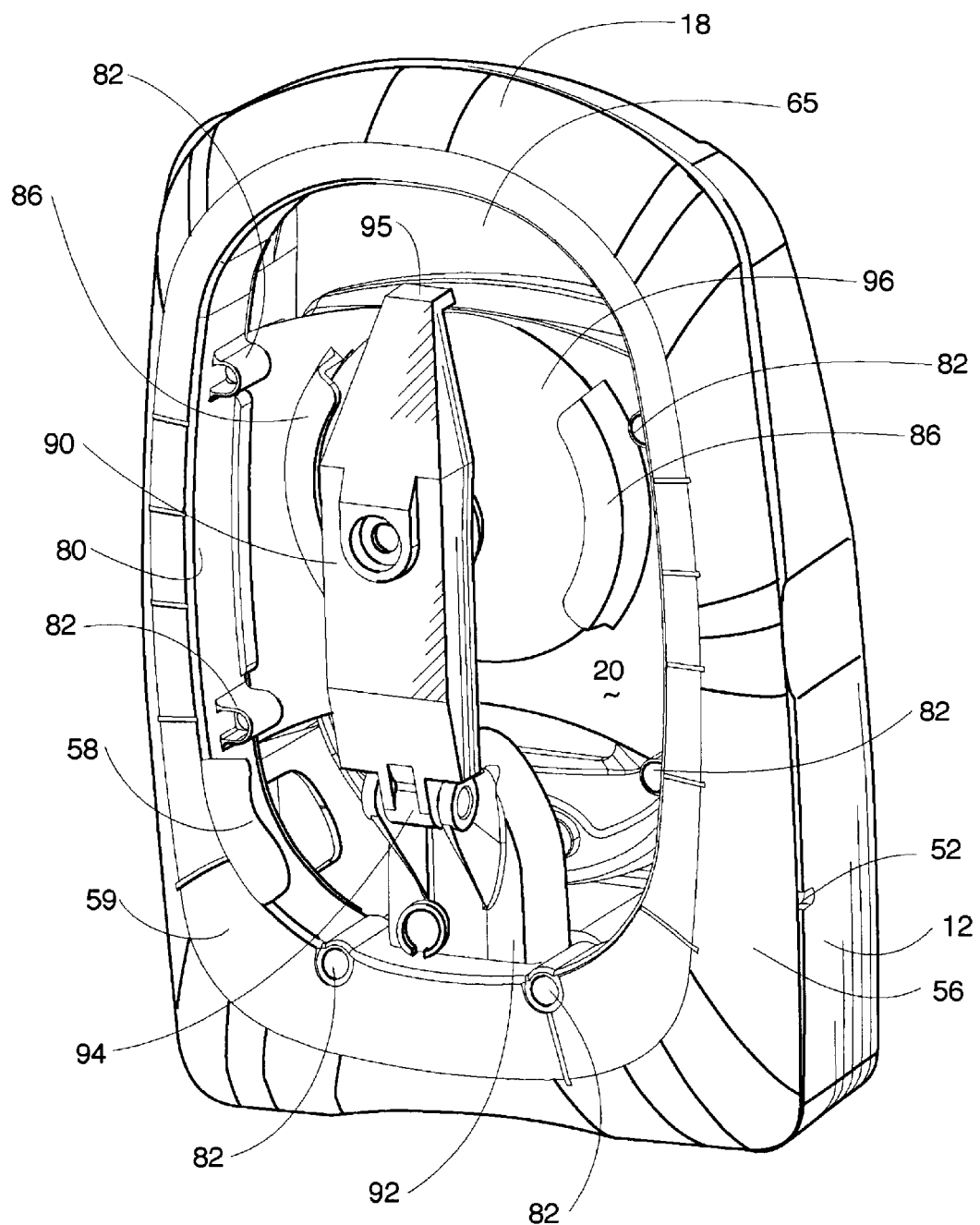
FIG. 3 is a back perspective view of the fish finder device illustrated in FIG. 1 in a storage position.

FIG. 3 is a perspective illustration of the back of the fish finder 10. A retainer ring 80 includes spaced-apart passages 82. The passages 82 receive screws (not illustrated) for securing the retainer ring 80 to the back wall 19 and the plate 20. The retainer ring 80 abuts against the first portion 58 (shown in partial cut-away view) of the skirt 56. The retaining ring 80 thereby holds the skirt 56 secured to the shell 11 of the fish finder 10. The plate 20 further defines opposed flanges 86 that extend outwardly from the plate 20.

In the illustrated embodiment, the flanges 86 are arcuate. The flanges 86 define recesses on the back side of the plate 20.

With reference to FIGS. 2 and 3, a transducer bracket 90 attaches to a transducer housing 92 at a pivot 94. An opposing end of the bracket 90 defines a flange 95. A suction cup 96 connects to the transducer bracket 90. The suction cup 96 is resilient and flexible. Opposing side edges of the suction cup 96 detachably engage the opposing flanges 86 by slipping into the recesses outwardly of the plate 20. This attaches the transducer bracket 90 with the transducer housing 92 in a cavity on the back of the fish finder 10 for handling and storage. The transducer 92 includes a socket 97 for connecting a signal cable 98 (illustrated in FIG. 4).

Figure 4:
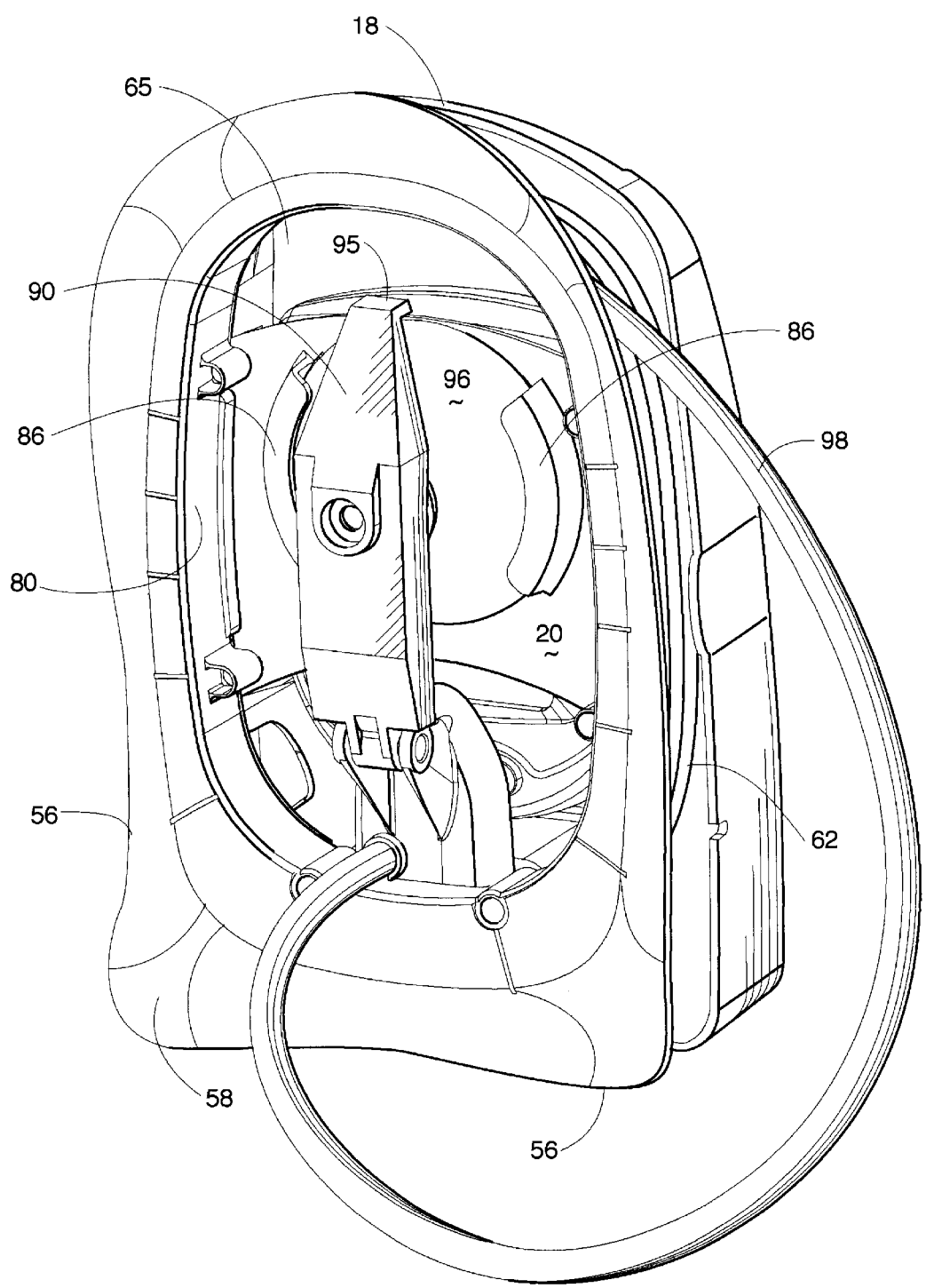
FIG. 4 is a back perspective view illustrating operative features of the present invention.

FIG. 4 is a back perspective view of the fish finder 10 with the skirt 56 in an outwardly flexed position to illustrate the cavity 62. The skirt 56 is a rubber-like resilient material. The cavity 62 defines a space for the signal cable 98 to wind or wrap around the perimeter of the shell 11 (or a portion thereof).

Figure 5:
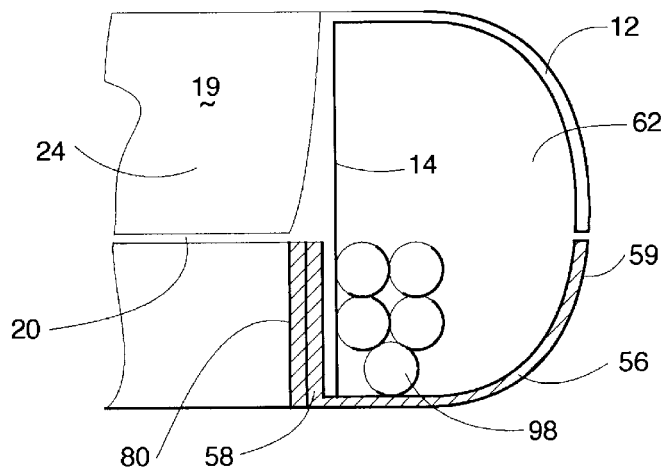
FIG. 5 is a detailed cross-sectional view of a side of the fish finder device taken along line 5—5 in FIG. 1.

FIG. 5 is a detailed cross-sectional view of a side of the portable fish finder 10 taken along line 5—5 in FIG. 1. The shell 11 includes the outer wall 12 and inner wall 14 with the laterally extending plate 20 defining the recess 24 for receiving the pivoted fish finder device 28. The retainer ring 80 and the inner wall 14 sandwich the first portion 58 of the skirt 56 and the second portion extends arcuately towards the distal edge of the outer wall 12. The skirt 56, the inner wall 14 and the outer wall 12 define the cavity 62 into which the signal cable 98 is wound for storage (several windings are shown in FIG. 5). The skirt 56 flexes outwardly and away from the distal edge of the outer wall 12 to open the cavity 62 for unwinding the signal cable 98.

Figure 6:
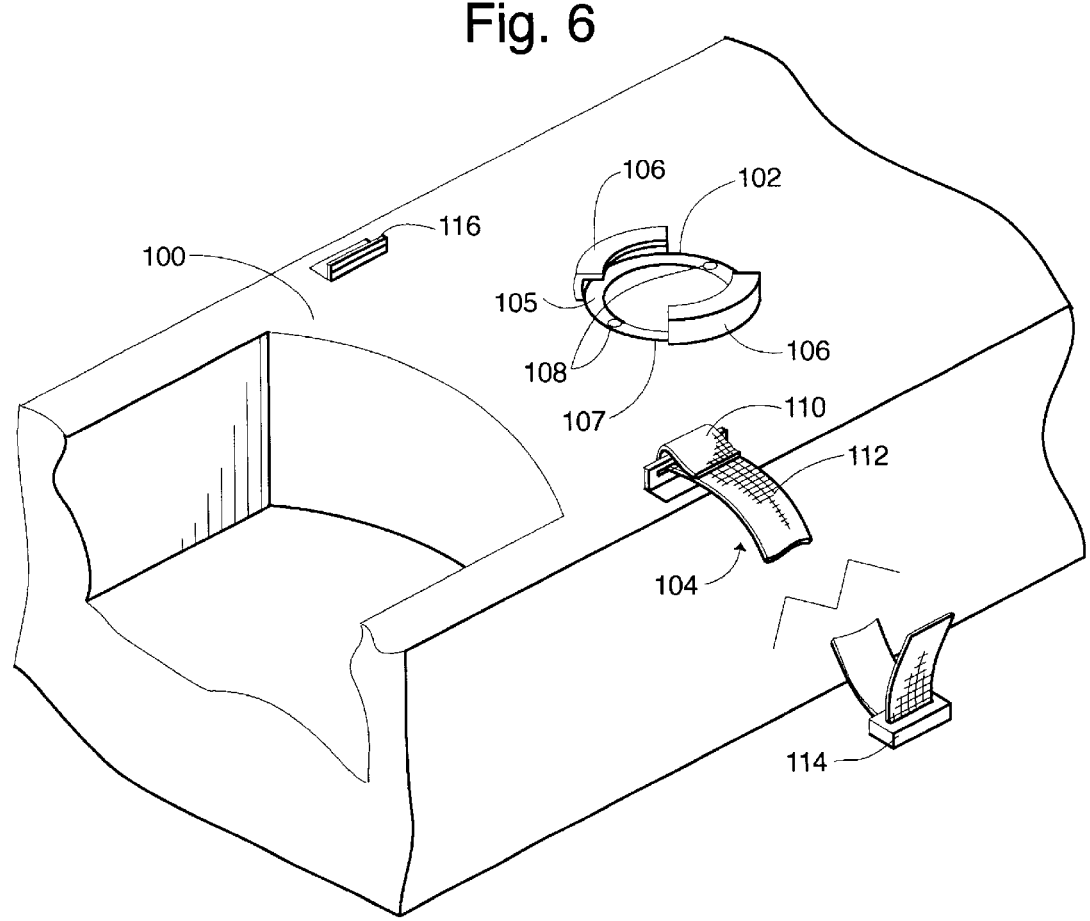
FIG. 6 is a perspective view of an aft portion of a water craft illustrating two alternative devices for securing the fish finder device illustrated in FIG. 1 to the water craft.

FIG. 6 illustrates a perspective view of an aft portion of a water craft 100 illustrating two alternative mounting devices 102, 104 for securing the fish finder 10 illustrated in FIG. 1 to the water craft. The device 102 comprises a base 105 from which opposing tabs or flanges 106 extend. The flanges 106 define opposing gaps 107. The flanges 106 detachably engage the flanges 86 on the back of the plate 20 of the fish finder 10. The base 105 defines openings 108 for receiving fasteners such as screws to connect the base to the water craft.

The second mounting device 104 comprises a bracket 110 on a side portion of the water craft. A strap 112 attaches to the bracket 110. A buckle 114 engages a distal end portion of the strap 112. A connector 116 extends from an opposing portion of the water craft 100 spaced-apart from the bracket 110. The connector 116 matingly engages the buckle 114.

With reference to FIG. 1, the portable fish finder 10 provides a convenient package or housing for the fish finder device 28 pivotally connected to the shell 11 that incorporates the cavity 62 for receiving windings of the signal cable 98 around a perimeter. The resilient skirt 56 provides a base for the portable fish finder 10 to sit on a boat surface which skirt 56 also flexes outwardly to allow the signal cable 98 to be wound or unwound from the cavity 62.

With reference to FIGS. 1 and 2, the fastener 44 is loosened in order to allow the fish finder housing 40 to pivot from the recessed position within the recess 24 to an outward position as illustrated in FIG. 1 at an oblique angle relative to the shell 11. This disposes the control buttons 29 and the display screen 31 for the fish finder device 28 in an accessible operational position. The screen 31 of the fish finder device 28 is disposed upwardly and outwardly for viewing. With reference to FIG. 3, the suction cup 96 detaches from the engagement with the flanges 86 in order to remove the transducer bracket 90 from the back of the portable fish finder 10.

With reference to FIG. 4, the skirt 56 flexes outwardly and thereby exposing the signal cable 98 within the cavity 62. The signal cable 98 unwinds from its stored position in order to separate the transducer bracket 90 from the shell 11 and the fish finder device 28. The transducer bracket 90 mounts to an outside portion of the hull of a boat. The unwound signal cable 98 extends to allow remote positioning of the transducer bracket 90. The suction cup 96 adheres the transducer bracket 90 to the hull. The flange 95 defines a stop against the hull. The transducer 92 is disposed below the surface of the water for communicating sound waves through the water and receiving return echos. The signal cable 98 communicates with the fish finder device 28 which analyzes the signals representative of the return echos for display of detected articles on the screen 31.

The fish finder 10 seats on a portion of a water craft. As illustrated in FIG. 1, the skirt 56 contacts the surface of the water craft. The skirt 56 is preferably formed of a flexible material that resists slipping on the surface of the water craft. The skirt 56 accordingly holds the fish finder 10 to the water craft during operation of the water craft.

However, FIG. 6 illustrates two alternative mounting devices 102, 104 for securing the fish finder 10 to a water craft. With the mounting device 102, the boater aligns the flanges 86 of the fish finder 10 in the gaps 107, and rotates the fish finder device to mating engage the flanges 86, 106. The flanges 106 preferably are tapered in thickness, so as to interlock the flanges together.

With the mounting device 104, the fish finder 10 seats on the water craft between the bracket 110 and the connector 116. The strap 112 loops over the fish finder 10 bearing on the ribs 54. The buckle 114 engages the connector 116. The strap 112 is tightened to engage the ribs 54 against the strap and thereby hold the fish finder 10 to the water craft.

While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A portable depth finder device for water craft, comprising:
    a housing defining a wrap cavity in at least a portion of the housing for receiving a signal cable;
    a skirt connected to the housing and movable between a first position covering the wrap cavity and a second position uncovering the wrap cavity; and
    a depth finder device mounted to the housing for communicating through the signal cable with a transducer assembly, whereby the signal cable wrapped in the wrap cavity for storage and unwrapped therefrom when the housing is disposed on a portion of a water craft with the transducer assembly communicating in a body of water for underwater articles.

2. The portable depth finder device as recited in claim 1, wherein the skirt is a flexible material.

3. The portable depth finder device as recited in claim 1, wherein the housing defines a first recess; and further comprising:
    a pivot mount extending from the housing adjacent the first recess to engage the depth finder device for selective positioning in a first position with the depth finder disposed within the first recess and a second position disposed at an angle extending from the housing for viewing a display in the depth finder device.

4. The portable depth finder device as recited in claim 3, wherein the pivot mount comprises a pair of extending flanges defining aligned openings for receiving a fastener therethrough; and
    the depth finder device defines a passageway in a portion thereof received by the flanges with the fastener securing the depth finder device to the pivot mount for selective positioning relative to the housing.

5. The portable depth finder device as recited in claim 1, wherein the housing defines at a first end a hand grip for carrying the housing.

6. The portable depth finder device as recited in claim 1, wherein the cable wrap cavity extends around a perimeter of the housing.

7. The portable depth finder device as recited in claim 1, wherein the flexible skirt has a first portion and a second portion, the first portion being received against a flange extending from the housing and the second portion angling outwardly from the first portion; and
    further comprising a fixing member received against an outer face of the first portion and secured to the housing to fix the flexible skirt to the housing.

8. The portable depth finder device as recited in claim 1, further comprising a transducer mounted to a support arm having a suction cup for attaching the support arm to a transom of the water craft, the transducer communicating with the depth finder device by a signal cable that wraps in the cavity for storage.

9. The portable depth finder device as recited in claim 8, further comprising a pair of opposing spaced-apart angled flanges extending from a portion of the housing, whereby the transducer is disposed with the housing for storage by engaging opposing edges of the suction cup in the flanges.

10. The portable depth finder device as recited in claim 9, wherein the angled flanges extend from a plate centrally disposed in the housing, to define a second recess opposing the first recess for receiving the support arm therein.

11. The portable depth finder device as recited in claim 9, further comprising a mount for attaching to a portion of the water craft, the mount having opposing spaced-apart angled tabs that matingly engage the angled flanges, whereby the housing is readily attachable to the water craft for use.

12. The portable depth finder device as recited in claim 1, wherein the depth finder device is mounted so that a display screen is received within the housing when the depth finder device is in a first position.

13. A portable depth finder device for water craft, comprising:
    a housing defining a first recess and a cable wrap cavity about a perimeter of the housing that receives a signal cable;
    a flexible skirt connected to the housing and movable between a first position covering the cable wrap cavity and a second position partially uncovering the cable wrap cavity;
    a depth finder device pivotally mounted to the housing for selectively being disposed in a first position with a display screen of the depth finder device within the first recess of the housing for storage and handling of the housing and a second position disposed at an angle extending from the housing for viewing the display screen of the depth finder device;

a transducer; and the signal cable communicating between the depth finder device and the transducer, the signal cable wrapped in the cable wrap cavity for storage and unwrapped therefrom when the housing is disposed on a portion of a water craft with the transducer in a body of water for determining depths.

14. The portable depth finder device as recited in claim 13, wherein the pivot mount comprises a pair of extending flanges defining aligned openings for receiving a fastener therethrough; and the depth finder device defines a passageway in a portion received by the flanges with the fastener securing the depth finder device to the pivot mount for selective positioning relative to the housing.

15. The portable depth finder device as recited in claim 13, wherein the housing defines a handle.

16. The portable depth finder device as recited in claim 13, wherein the flexible skirt has a first portion and a second portion, the first portion being received against an extended portion of the housing and the second portion angling outwardly from the first portion; and further comprising a fixing member received against an outer face of the first portion and secured thereto to fix the flexible skirt to the housing.

17. The portable depth finder device as recited in claim 13, further comprising a support arm having a suction cup for attaching the support arm to a transom of the water craft, the transducer attached to a distal end portion of the support arm.

18. The portable depth finder device as recited in claim 17, further comprising a pair of opposing spaced-apart angled projections extending from the housing, whereby the transducer is disposed with the housing for storage by engaging opposing edges of the suction cup in the projections.

19. The portable depth finder device as recited in claim 18, wherein the angled projections extend from a plate centrally disposed in the housing which plate defines a second recess opposing the first recess for receiving the support arm therein.

20. The portable depth finder device as recited in claim 13, further comprising means for detachably connecting the housing to a portion of the water craft.

21. The portable depth finder device as recited in claim 20, wherein mount means comprises a bracket adapted for fastening to the water craft, the bracket having opposing spaced-apart angled tabs that matingly engage the angled projections, whereby the housing is detachably engagable to the water craft for use.

22. A portable depth finder device for water craft, comprising:

a housing with an intermediate plate defining a first recess and an opposing second recess, with a hand grip at a first end of the housing, and a cable wrap cavity defined about at least a portion of a perimeter of the housing;

a pair of spaced-apart angled projections extending from the intermediate plate into the second recess;

a flexible skirt connected by a first portion to the housing and having a second portion movable between a first position covering the cable wrap cavity and a second position uncovering the cable wrap cavity;

a depth finder device pivotally mounted to the housing for selectively being disposed in a first position with a display screen of the depth finder device within the first recess of the housing for storage and handling of the housing and a second position disposed at an angle extending from the housing for remote viewing of the display screen;

a support arm having a suction cup for attaching the support arm to a transom of the water craft and a transducer attached to a distal end portion of the support arm, the support arm disposed within the housing for storage and handling by engaging edge portions of the suction cup to the projections; and a signal cable for communicating between the depth finder and the transducer, whereby the signal cable wraps in the cable wrap cavity for storage and unwraps therefrom when the housing is disposed on a portion of a water craft with the transducer in a body of water for determining depths.

23. The portable depth finder device as recited in claim 22, wherein the pivot mount comprises a pair of extending flanges defining aligned openings for receiving a fastener therethrough; and the depth finder device defines a passageway in a portion thereof received by the flanges with the fastener securing the depth finder device to the pivot mount for selective positioning relative to the housing.

24. The portable depth finder device as recited in claim 22, wherein the flexible skirt is secured to the housing by a retainer ring engaged to the housing.

25. The portable depth finder device as recited in claim 22, further comprising means for detachably connecting the housing to a portion of the water craft.

26. The portable depth finder device as recited in claim 25, wherein means for detachably connecting comprises a bracket adapted for fastening to the water craft, the bracket having opposing spaced-apart angled tabs that matingly engage the angled projections, whereby the housing is detachably engagable to the water craft for use.

* * * * *